(12) United States Patent
Fukui et al.

(10) Patent No.: US 8,041,349 B2
(45) Date of Patent: Oct. 18, 2011

(54) HOME SUBSCRIBER SERVER CONFIGURATION METHOD AND SYSTEM

(75) Inventors: Keiji Fukui, Tokyo (JP); Tetsuo Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 854 days.

(21) Appl. No.: 12/049,103

(22) Filed: Mar. 14, 2008

(65) Prior Publication Data

US 2008/0227451 A1    Sep. 18, 2008

(30) Foreign Application Priority Data

Mar. 16, 2007   (JP) ................................. 2007-069084

(51) Int. Cl.
*H04W 4/00* (2009.01)
(52) U.S. Cl. ................. 455/422.1; 455/432.3; 455/435.1
(58) Field of Classification Search ....... 455/410–412.1, 455/413–414.3, 432.3, 433, 435.1–435.3, 455/422.1
See application file for complete search history.

(56) References Cited

U.S. PATENT DOCUMENTS

| | | | |
|---|---|---|---|
| 7,831,246 B1 * | 11/2010 | Smith et al. ................ | 455/420 |
| 2007/0121584 A1 * | 5/2007 | Qiu et al. ................... | 370/352 |
| 2007/0192838 A1 * | 8/2007 | Laitinen et al. ............. | 726/4 |
| 2007/0288655 A1 * | 12/2007 | Price et al. ................. | 709/245 |
| 2008/0064369 A1 * | 3/2008 | Xie et al. ................... | 455/411 |
| 2008/0104696 A1 * | 5/2008 | Li et al. ..................... | 726/21 |
| 2008/0150683 A1 * | 6/2008 | Mikan et al. ............... | 340/5.31 |
| 2008/0160996 A1 * | 7/2008 | Li et al. ..................... | 455/433 |
| 2009/0215453 A1 * | 8/2009 | Blanco Blanco et al. .. | 455/435.1 |

FOREIGN PATENT DOCUMENTS

JP           2006115453 A      4/2006

OTHER PUBLICATIONS

"IMS, a core of NGN", http://web.forum.impressrd.jp/feature/, published on WBB Forum 2006-2007.

* cited by examiner

*Primary Examiner* — Simon Nguyen

(57) ABSTRACT

The present invention is to provide a home subscriber server configuration method and system that is accessible in switching to any one of plural HSS servers in a redundant configuration. Information stored in such plural HSS servers (e.g., HSS-A server 40A and HSS-B server 40B) are synchronized as identical information. When an interrogation for a particular HSS server to be accessed from the I-CSCF server 30 or the S-CSCF server 21 is received, the access information for the plural HSS servers 40A, 40B corresponding to the interrogation is returned after rearranging to the predetermined order of priority to the I-CSCF server 30 or the S-CSCF server 21 from which the inquiry is originated. If no response is received from either one of the HSS servers returned from the SLF server 50 within a predetermined time after the access or if no response is received to the resend operations, the I-CSCF server 30 or the S-CSCF server 21 selects the next HSS server from the plural HSS servers and gains access to such HSS server after switching thereto.

10 Claims, 9 Drawing Sheets

HOME SUBSCRIBER SERVER
CONFIGURATION METHOD AND SYSTEM

INCORPORATION BY REFERENCE

This application is based upon and claims the benefit of priority from Japanese patent application no. 2007-069084, filed on Mar. 16, 2007, the disclosure of which is incorporated herein in its entirety by reference.

FIELD OF THE INVENTION

The present invention relates to a home subscriber server configuration method and system, more particularly to home subscriber configuration method and system comprising a plurality of home subscriber servers (referred to as "HSS servers" below) each of which is designed to store information such as subscriber information (user information) for user equipment connected to a home network of an IP network in order to provide IMS communication services and information for selecting an S-CSCF (Serving Call Server Control Function) server in an NGN/IMS (Next Generation Network/IP Multimedia Subsystem) network.

BACKGROUND OF THE INVENTION

Currently, as a next generation communication network NGN (Next Generation Network), intensive studies have been made on a core technology known as an IMS (IP Multimedia Subsystem) for flexibly providing multimedia applications including not only stationary communications and mobile communications but also audios, videos and the like by a packet communication network based upon the IP (Internet Protocol) communication protocol. See, for example, "IMS, a core of NGN" internet URL (http://web.forum.impressrd.jp/feature/) and Japanese patent publication (JP2006-115453A) for more information.

The IMS architecture comprises basic constituting elements as shown in FIG. 5. That is, FIG. 5 is a conceptual illustration of basic constituent elements of the IMS network. It comprises various multimedia terminals, i.e., user equipment UE (User Equipment) 201, 202 including mobile phones, stationary telephones, PDAs, notebook PCs, desktop PCs and the like as IMS clients, an IP network 500 including a plurality of IP networks such as a home network 100, another network (within the zone) 101 and the like, and application server group 300 such as application servers AS301, AS302, etc.

The IP network 500 interconnects the IMS clients, i.e., the user equipment UE 201, 202 using broadband networks such as ADSL, FTTH, etc. or wireless interfaces. Also, the IP network 500 interconnects the user equipment UE 201, 202 using the IP protocol for all communications, thereby enabling to commonly use the application servers AS301, AS302 for realizing various services. It is to be noted that the IP network 500 uses an SIP (Session Initiation Protocol) to control making or breaking of communication paths to be used for services. For this end, a plurality of SIP servers 100A, 100B, 101A and the like are installed in the IP network 500 so that they cooperate with one another.

In other words, the IMS communication provides a common system for providing various services (multimedia services) on the IP protocol based packet communication network. Using the IP protocol and interconnecting the user equipment UE 201, 202 that are provided with interfaces for IMS, the IP network 500 enables to perform communications using various media and make a connection to the application server AS301 for providing application services using audios and videos that the user chooses from the application server group 300 that provides various multimedia services.

Moreover, the IP network 500 allows the user equipment UE 201 to gain access to the home network 100 from another network 101 in his/her office for receiving the same services as from the home network 100 even if the user equipment UE 201 may move between networks. When moved to any other network, roaming is performed with the home network 100, thereby enabling to receive the same services as he/she is located in the home network 100. For this end, by the use of the system of performing the "home network control" that cooperates with the SIP server 101A in another network 101 at the location where he/she moves and the SIP servers 100A, 100B in the home network 100, the user is able to use always the same services whichever network he/she may move without depending upon the network at the location where he/she is.

Now, functions of the SIP servers 100A, 100B, 101A and the like as shown in FIG. 5 will be described in greater detail with reference to FIG. 6. FIG. 6 is a conceptual diagram to show functions of the SIP servers that are key constituent elements of the IP network 500 in the IMS architecture. The SIP servers comprise at least one of three kinds of functions. One is a P-CSCF (Proxy Call Server Control Function: proxy control function) for enabling the user equipment UE to gain access either directly or by way of an access network. One of the other functions is an I-CSCF (Interrogating CSCF: interrogating control function) for accepting any interrogation from other CSCFs or having a gateware function with other networks. The last one is an S-CSCF (Servicing CSCF: call session control function) for performing a session control based upon the SIP in the home network. In other words, the P-CSCF function constitutes a user equipment accommodation session control server, the I-CSCF function constitutes an interrogating session control server and the I-CSCF function constitutes a call session control server for performing a core call session control in the IMS network.

Each of the P-CSCF, I-CSCF and S-CSCF functions may be configured as a physically separated server (i.e., a P-CSCF server, an I-CSCF server or an S-CSCF server) or alternatively one or more functions may be physically merged with another as an integrated server. Moreover, it is also possible to configure a single server having a plurality of divided sections for the same function so as to split the loads.

Each of the SIP servers 100A, 100B and 101A as exemplified in FIG. 5 is provided with either one or more of these functions. In the particular example as shown in FIG. 6, the SIP server 100A in the home network 100 is provided with a P-CSCF function 10A for connecting the user equipment UE 202 and a single S-CSCF function 20A. The SIP server 100B is provided with a pair of S-CSCF functions 20B, 21B and an I-CSCF function 30B for making connection with another network 101 in which the user equipment UE 201 is moved. On the other hand, the SIP server 101A in another network 101 is provided with a P-CSCF function 11A for connecting the user equipment UE 201 and an I-CSCF function 31A for making connection with the home network 100. As described hereinbefore, each SIP server is provided with a plurality of CSCF functions and it is also possible to provide independent servers depending upon traffic amounts just like in this particular example.

Moreover, as shown in FIG. 6, disposed in the IP network are an HSS server (Home Subscriber Server) 40 and, if necessary, an SLF function (Subscriber Locator Function) 50 as a database server. The HSS server 40 is a database server for registering and saving such information as user information, profiles on services that each user subscribes, user authentication information, user movement management information (current location information) and the like, thereby registering all information that are required when each CSCF function performs session control. On the other hand, the SLF function 50 is a database for registering the information to show the relationship between the HSS server 40 in which user information are registered and the users. If there are plural HSS servers within the network, the SLF function 50 has a function to receive interrogations from the I-CSCF function and conduct a search for a particular HSS server in which the user information for the interrogated user is registered.

Now, detailed descriptions will be given hereunder on each function of the P-CSCF function, the I-CSCF function and the S-CSCF function.

The P-CSCF function (Proxy Session Control function or User Equipment Accommodation Session Control Function) connects an IMS client or the user equipment UE by way of a broadband subscriber network such as ADSL, FTTH or the like or any other access network such as a wireless network, a PSTN network or the like for receiving SIP messages from the user equipment UE or transmitting or sending SIP messages to the user equipment UE. In case of connecting by way of the access network, a connection is made from the existing W-CDMA network for accommodating, for example, a mobile phone user equipment UE by way of a packet switching known as a GGSN (Gateway GPRS Support Node) that has a function of connecting to an external network. On the other hand, any access from the broadband access network such as fixed ADSL, FTTH or the like or from the wireless LAN is connected by way of a relay router in the IP network of the access system.

The P-CSCF function is allocated at the registration (location registration) time of the user that is performed prior to start of IMS communication. After completing authentication between the user equipment UE and the IMS communication IP network, an IPsec tunnel is set between the user equipment UE for maintaining communication secrecy. All SIP messages that are transmitted or received between the user equipment UE are transferred safely over the IPsec tunnel and rationality check of the received SIP messages is also made in the P-CSCF function. Not only the P-CSCF function within the home network but also roaming is performed using the P-CSCF function in another network at the location where the user is moved in, thereby enabling to effectively transfer the traffic from the user equipment UE to the network at the moved location. However, it is to be noted that tunneling is made on all traffics such as VoIP or the like from the user equipment by the P-CSCF function in the home network if no IMS function is included in the network at the moved location.

The I-CSCF function (Interrogating Session Control Function) is disposed in the home network. At the registration time of the user equipment UE to the IMS communication IP network that is performed prior to start of communication, it identifies the HSS server in which the user information (i.e., subscriber information) of the user equipment UE is registered by making a reference with the SIP messages received by the P-CSCF function or by gaining access, if necessary, to the SLF function (i.e., Subscriber Locator Function) if there are plural HSS servers (i.e., Home Subscriber Servers) in which the user information (subscriber information) is registered. Then, a decision is made of the S-CSCF function that performs the call session control of the user equipment UE in response to the information from the HSS server. The SIP messages of the user equipment UE that are received from the determined P-CSCF function are routed for succeeding the registration procedures for the user equipment UE.

Furthermore, the I-CSCF function determines the S-CSCF function that performs the call session control for the user equipment UE by gaining access to the HSS server in which the user information (subscriber information) for the user equipment UE is registered even if accessed through any other network, thereby succeeding communication from the other network. This means that the I-CSCF function enables to smoothly split loads in case of existence of plural HSS servers and simultaneously plays a role of shielding the structures within the network from outside networks.

The S-CSCF function (Call Session Control Function) is a SIP server that is a core of the session control by the SIP protocol as a SIP registration server that performs the call session control of the user equipment UE utilizing the registered IMS services and holds the user information (subscriber information) and the current location information of the user equipment UE that are downloaded from the HSS server. It also performs the session control of the communications between user equipment UE and activates the service procedures of the application server AS in response to the request of the user equipment UE in accordance with the user information (subscriber information) setting that is registered in the HSS server. Moreover, when the user equipment UE appoints with whom to communicate by its telephone number based upon the E.164 Recommendation, it has a function to make the routing based upon such telephone number.

The S-CSCF function makes a connection to a common enabler (general purpose functions to be used to realize application services such as presences, messages or the like) to be commonly used for various different application services and the application servers AS for performing controls for individual application services by way of a standard interface known as the SIP based ISC (IMS Service Control).

On the other hand, the application server group 300 including a plurality of AS (Application Servers) 301, 302, . . . as shown in FIG. 5 are a group of servers for processing various application services. They are activated by the S-CSCF function in response to the processing request from each user equipment UE. It is to be noted that applications for services similar to the conventional telephone network are also provided.

Now, basic transmission (i.e., sending) and receiving procedures in case when the IMS user performs IMS communications will be described hereunder with reference to FIGS. 7 and 8. FIG. 7 is a flowchart to show the flow of transmission (or calling) procedures when the user equipment UE performs IMS communications. On the other hand, FIG. 8 is a flowchart to show receiving procedures when the user equipment UE performs IMS communications. In the following descriptions, the servers for performing the P-CSCF function, the I-CSCF function and the P-CSCF function are referred to as the P-CSCF server, the I-CSCF server and S-CSCF server, respectively.

Firstly, the transmission or calling procedures will be described with reference to FIG. 7. The user equipment UE uses an "INVITE message" in order to start a session. The user equipment UE sets the URI (Uniform Resource Identifier) for the S-CSCF server that are stored at the registration time prior to starting IMS communications as the "Service-Route" header in the "INVITE message" for instructing the routing to the user equipment UE (sequence SQ21). The P-CSCF server that received the "INVITE message" from the user equipment UE makes a reference with the S-CSCF server that is memorized at the registration time. If agrees, the received "INVITE message" is transferred to the S-CSCF server without gaining access to the I-CSCF server (sequence SQ22).

The P-CSCF server that received the "INVITE message" from the I-CSCF server determines the routing for transmitting the "INVITE message" based upon the information with whom the communication is made as designated in the "INVITE message" (sequence SQ23). Subsequently, the S-CSCF server receives a tentative response "100 Trying" that indicates to have received the "INVITE message" from the subsequent CSCF at the receiving side (sequence SQ24). When receiving a tentative response "180 Ringing" that indicates ringing (sequence SQ26), it is transferred to the respective transmission (calling) side user equipment UE (sequence SQ25 and sequence SQ27).

The transmission side user equipment UE that received the tentative "180 Ringing" or the S-CSCF server that received a final response "200 OK" that indicates the session setting completion is received from the subsequent CSCF side (i.e., the receiving side user equipment UE in the particular example in FIG. 7) (sequence SQ28) transfers the received "200 OK" to the transmission side (i.e., precedent transmission side in FIG. 7) (sequence SQ29). When an acknowledgement response "ACK" to the "200 OK" is received from the transmission side (sequence SQ30), the S-CSCF completes the set-up procedures for opening the session and sends the acknowledgement response "ACK" to the transmitter of the "200 OK" (sequence SQ31), thereby establishing the transmission side communication session of the IMS communication in accordance with the SIP protocol.

The "INVITE message" in accordance with the SIP protocol adopts means for confirming reliable data transmission to the communication partner by three directional handshakes of "request (INVITE)", "final response (200 OK)" and "acknowledgement (ACK)". Moreover, a tentative responses of "1 xy" (100 Trying and 180 Ringing) is returned from the receiving side to the transmission side before returning the "200 OK", thereby notifying the progress of the session set-up.

It is to be noted that the "INVITE message" and the "200 OK" (success message of session set-up request) in the IMS communication use the protocol known as an "SDP (Session Description Protocol)" that describes the contents of the established multimedia session.

Now, the receiving procedures will be described hereunder with reference to FIG. 8. The "INVITE message" from the S-CSCF server at the transmission or calling side is received by the I-CSCF server (sequence SQ41). The I-CSCF server interrogates the HSS server about the S-CSCF server allocated thereto at the registration time of the user equipment UE at the receiving side using the Diameter protocol and routing of the received "INVITE message" is made to the URI for the S-CSCF server that is returned from the HSS server (sequence SQ42).

The S-CSCF server that received the "INVITE message" distinguishes the URI for the P-CSCF server that is recorded at the registration time based upon the information set in the Path header and routing of the "INVITE message" is made to the P-CSCF server (sequence SQ43). Then, the P-CSCF server transfers the "INVITE message" to the user equipment UE that is designated in the received "INVITE message" (sequence SQ44) and returns to the S-CSCF server at the receiving side by way of the S-CSCF server and the I-CSCF server the tentative response "100 Trying" to indicate that the "INVITE message" has been distributed to the user equipment UE (sequence SQ45).

The user equipment UE that received the "INVITE message" goes to the ringing state for calling the user and returns the tentative response "180 Ringing" to the P-CSCF server (sequence SQ46). The P-CSCF server that received the tentative response "180 Ringing" indicating to be called by the user equipment UE transfers the tentative response "180 Ringing" to the S-CSCF server at the receiving side by way of the S-CSCF server and the I-CSCF server (sequence SQ47).

Thereafter, when the user called from the user equipment UE responds, the user equipment UE transmits the final response "200 OK" to the P-CSCF server indicating that the request designated in the "INVITE message" has been accepted (sequence SQ48). The P-CSCF server that received the final response "200 OK" from the user equipment UE indicating that the request was accepted transfers the final response "200 OK" to the S-CSCF server at the transmission side by way of the S-CSCF server and the I-CSCF server (sequence SQ49). Since the final response "200 OK" is returned in a form of including the URI for the CSCF servers other than the I-CSCF server sequentially inserted into the "Record-Route" header at the time of receiving the "INVITE message", all subsequent messages will be directly transmitted without any intervention of the I-CSCF server.

Thereafter, acknowledgement responses "ACK" of the transmission side to the returned final response "200 OK" are directly transmitted to the S-CSCF server at the receiving side from the S-CSCF server at the transmission side without any intervention of the I-CSCF server (sequence SQ50). The S-CSCF server at the receiving side that received the acknowledgement response "ACK" from the S-CSCF server at the transmission side transmits the acknowledgement response "ACK" to the user equipment UE at the receiving side by way of the P-CSCF server (sequence SQ51). As a result, established is the receiving side communication session by the IMS communication in accordance with the SIP protocol.

Now, basic procedures for terminating the IMS communication will be described with reference to FIG. 9. FIG. 9 is a sequence chart to show the flow of processing that the user equipment terminates the IMS communication. The User equipment UE for terminating communication and releasing the session transmits a "BYE message" that means the end of session to the communicating user equipment UE through the route of the P-CSCF server and the S-CSCF server at the transmission side as well as the S-CSCF server and the P-CSCF server at the receiving side that are used in the IMS communication (sequence SQ61).

The receiving side user equipment UE that received the "BYE message" returns a final response "200 OK" indicating that the release of session is accepted to the "BYE message" transmitting user equipment UE in the opposite direction to the transmission route of the "BYE message" (sequence SQ62). As a result, the communication session is released. Different from the "INVITE message", the "BYE message" adopts a two-directional shake-hand system of the "request (BYE)" and the "200 OK".

If the user equipment UE uses an application service that the application server AP provides, such set-up is made at the registration time of the IMS communication and a "Filter Criteria" that is a reference of judgment of the application service is returned to the S-CSC server from the HSS server. Examples of the "Filter Criteria" include, for example, types of message, direction of session, kinds of registration (initial registration, re-registration and erase of registration), presence or absence and contents of the SIP header, SDP (Session Description Protocol) parameters (kinds of medium) and the like. Also included is designation information of the application server AS that is included in the routing of the SIP message.

It is to be noted that the use of the application server AS enables to provide telephone services similar to the line switching such as a call transferring service or the like other than music and video distribution services such as, for example, "karaoke" services and VoD (Video on Demand) services.

When SIP messages from the user equipment UE are received, the S-CSCF server performs session control to transfer to the application server AS only SIP messages that satisfy the "Filter Criteria" by referring to the "Filter Criteria" that was received from the HSS server at the registration time of the IMS communication. In this way, SIP messages that are transferred to the application server AS are able to be transferred from the application server AS to the distribution addresses for providing the corresponding services.

As for identifiers for identifying the kind of services, used is a "public service ID (PSI)" similar to the "public user ID (IMPU)" for identifying each subscriber. By designating a desired PSI by the user equipment UE, the S-CSCF server directly routes the messages to the application server AS corresponding to the designated PSI, thereby enabling to provide the application services.

In the IMS architecture having the network construction as described hereinabove, it is required that the user equipment UE performs proceedings (i.e., registration request by REGISTER message) to determine the S-CSCF server for making a call session control for each user equipment UE among a plurality of S-CSCF servers (call session control servers) disposed in the home network of each user equipment UE prior to transmission and receiving operations of each user equipment UE using the SIP protocol.

At this time, the P-CSCF server that received the registration request by the REGISTER message from the user equipment UE sends an interrogation to the I-CSCF server. If there are a plurality of HSS servers, the I-CSCF server that received the interrogation gains access to the SLF server in order to determine the particular HSS server that stores the user information for the user equipment to be registered and causes the particular HSS server to transfer a list of S-CSCF servers that are available to the user equipment UE for allocation. Then, the S-CSCF server in charge of registering the user equipment UE that sends the registration request, i.e., the S-CSCF server for making the call session control for the user equipment UE is determined from the list of the transferred S-CSCF servers.

In the prior art, if there are a plurality of HSS servers in the IP network of the home network, it is required to gain access to the SLF server in order to identify a single HSS server in which user information of the user equipment UE interrogated from the I-CSCF server is registered and returns the information to the interrogated user equipment even if user information for each user equipment UE is registered in a different HSS server or the HSS servers are made in a redundant or duplicated configuration for each area.

In other words, when access is made to the HSS server in order to acquire information for selecting the S-CSCF server from the I-CSCF server at the user registration time or in order to acquire the user information for the user equipment UE to be newly registered from the S-CSCF server that is determined as the one for the call session control for the user equipment UE, the SLF server returns the information for only either one of the HSS servers.

As a result, for example, if the HSS server was unable to return the user information for selecting the S-CSCF server or return the user information for the user equipment UE to the I-CSCF ser or the S-CSCF server due to any cause when access is made to the particular HSS server designated by the SLF server, there encounters a problem that no IMS service is provided to the user equipment UE. Alternatively, even if the HSS servers are duplicated in a redundant configuration for each area, since there is no mechanism for promptly transmitting the information to the SLF server when an access to one of the HSS servers is failed, any attempt to gain access to the SLF server so that the I-CSCF server or the S-CSCF server selects the HSS server other than the one failed to gain access does not guarantee that the SLF server retries to select the HSS server and return the appropriate HSS server.

SUMMARY OF THE INVENTION

In consideration of the aforementioned disadvantages or drawbacks of the prior art, it is an object of the present invention to provide a home subscriber server configuration method and system, wherein a plurality of HSS servers are provided in a redundant configuration for each area so that synchronized identical information is save in those HSS servers. As HSS server information to be returned from the SLF server to the I-CSCF server and the S-CSCF server, returned is access information for the respective HSS servers having information for selecting the corresponding S-CSCF server and the respective user information, thereby enabling to gain access by sequentially switching the HSS servers until successful access is achieved by the I-CSCF server and the S-CSCF server.

In order to solve the above problems and achieve the above objectives, the home subscriber server configuration method and system according to the present invention employ the following unique constructions:

(1) A home subscriber server configuration method in an IP network for achieving an IMS (IP Multimedia Subsystem) architecture, wherein a plurality of home subscriber servers (HSS servers) are provided for storing user information of user equipment and information for selecting call session control server (S-CSCF server) that administrates call session control, the plurality of HSS servers are in a redundant configuration for respective areas, and a particular HSS server to be accessed by an inquiry session control server (I-CSCF server) to determine the S-CSCF server to register a new user equipment or the S-CSCF server is determined by sending an interrogation from the I-CSCF server or the S-CSCF server to a subscriber locator server (SLF server) that stores a correspondence between the plurality of HSS servers and user equipment, comprising the steps of: synchronizing the information to be stored in the plurality of HSS servers in the redundant configuration; and sending by the SLF server that receives the interrogation from the I-CSCF server or the S-CSCF server access information corresponding to the interrogation for the plurality of HSS servers back to the I-CSCF server or the S-CSCF server from which the interrogation is originated.

(2) A home subscriber server configuration method of the above (1), wherein in case of sending the access information corresponding to the interrogation back to the plurality of HSS servers, the SLF server rearranges in accordance with the predetermined order of priority before sending back.

(3) A home subscriber server configuration method of the above (1), wherein in case of using the Diameter protocol for information exchange between the SLF server and the I-CSCF server or the S-CSCF server, the SLF server sends back by setting the access information to the plurality of HSS servers in parameters Redirect-Host AVP (Attribute Value pair) that are included in a response signal of the Diameter protocol.

(4) A home subscriber server configuration method of the above (1), wherein the I-CSCF server or the S-CSCF server that received the access information to the plurality of HSS servers corresponding to the interrogation from the SLF server gains access to the selected one of the plurality of HSS servers in accordance with the order that is transmitted from the SLF server or the order of priority that is predetermined by the I-CSCF server or the S-CSCF server.

(5) A home subscriber server configuration method of the above (4), wherein the I-CSCF server or the S-CSCF server selects the subsequent HSS server from the plural HSS servers if no response is received from the one HSS server within a predetermined time after the access to the one HSS server or if no response is received from the HSS server in response to accesses of a predetermined number of resending operations, thereby gaining access to the selected HSS server by switching thereto.

(6) A home subscriber server configuration method of the above (1), wherein the synchronizing operation of the information stored in the plural HSS servers in a redundant configuration is performed whenever the information stored in either one of the HSS servers takes place, thereby renewing information stored in other HSS servers to the same information.

(7) A home subscriber server configuration method of the above (1), wherein the synchronizing operation of the information stored in the plural HSS servers is performed periodically at a predetermined time interval.

(8) A home subscriber server configuration method of the above (7), wherein at the time of synchronizing information stored in each of the HSS servers, the original information for synchronizing each of the HSS servers is determined by majority decision, the information in a predetermined single HSS server, or based upon a result of the information rationality check.

(9) A home subscriber server configuration system in an IP network for realizing an IMS (IP Multimedia Subsystem) architecture having a plurality of home subscriber servers (HSS servers) in a redundant configuration for respective areas for storing user information for user equipment and information to select a call control server (S-CSCF server) for administering call session control by sending an interrogation to a subscriber locator server (SLF server) that stores the correspondence between the plurality of HSS servers and the user equipment from an interrogating session control server (I-CSCF server) for determining the S-CSCF server to register a new user equipment or from the S-CSCF server to determine the particular HSS server to be accessed by the I-CSCF server or the S-CSCF server, characterized in that: information stored in the plural HSS servers in a redundant configuration are synchronized; and when an interrogation is received from the I-CSCF server or the S-CSCF server, the SLF server sends access information to the plurality of HSS servers corresponding to the interrogation back to the I-CSCF server or the S-CSCF server from which the interrogation is originated.

(10) A home subscriber server configuration system of the above (9), wherein the SLF server rearranges the plural HSS servers in accordance with the predetermined order of priority when sending back the access information for the plural HSS servers corresponding to the interrogation.

(11) A home subscriber server configuration system of the above (9), wherein the I-CSCF server or the S-CSCF server that received the access information to the plural HSS servers corresponding to the interrogation from the SLF server gains access to the HSS servers selected from the plurality of HSS servers in accordance with the sequence sent from the SLF server or the order of priority predetermined in the I-CSCF server or the S-CSCF server.

(12) A home subscriber server configuration system of the above (11), wherein the I-CSCF server or the S-CSCF server selects the next one of the HSS servers and gains access to the selected HSS server after switching thereto if no response is received from the HSS server in response to the access for a predetermined time from the access to the HSS server or if no response is received from the HSS server in response to the access of predetermined times of resending operations.

The home subscriber server configuration method and system according to the present invention exhibit the following advantages:

Even if failed to gain access to either one of the HSS servers, it is assured to promptly gain access to a replacement HSS server, thereby enabling to quickly perform processing at the registration time of the user equipment, reduce calling failures of the IMS services due to failures in gaining access to the HSS server and improve IMS service quality to the user. This is because a plurality of HSS servers each having user information and information for selecting the S-CSCF server stored therein and also having synchronized identical information are provided in a redundant configuration for each area. Moreover, the SLF server for outputting the relationship between the HSS servers and the information for selecting user equipment and S-CSCF servers is constructed to output the access information for the redundant configuration HSS servers to the CSCF (I-CSCF and S-CSCF) servers from which interrogation is originated.

BRIEF DESCRIPTION OF THE DRAWINGS

In the accompanying drawings.

DESCRIPTION OF EXEMPLARY EMBODIMENTS

Now, exemplary embodiments of the home subscriber server configuration method and the home subscriber server configuration system according to the present invention will be described with reference to the accompanying drawings.

It is to be noted that a P-CSCF function, an I-CSCF function and an S-CSCF function constituting an exemplified SIP server are described as physically separated P-CSCF server, I-CSCF server and S-CSCF server in the following descriptions for ease of description. However, the present invention should not be restricted to such example and may be configured by physically merging either one of the functions with other function or functions as an integrated server. Moreover, it is possible to have the same function in a plurality of distributed forms within a single server. Additionally, the operation procedures (or steps) to be described in the following exemplary embodiment may be embodied in form of a program to be executed by a computer. Similarly, a recording medium containing such program is also an embodiment of the present invention.

(Features of the Present Invention)

Before describing the exemplary embodiment of the present invention, its primary features will be first described. In a next generation IP telephone network (NGN/IMS) having a plurality of HSS servers in a duplicated configuration for each area, the present invention synchronizes information stored in such plurality of HSS servers in a duplicated configuration. If the CSCF (I-CSCF and S-CSCF) servers fail to gain access to any one of the HSS servers, they try to gain access to another HSS server that is immediately switched from the first accessed HSS server, thereby enabling the CSCF servers to acquire necessary information for smoothly providing IMS services.

(Configuration of the Present Invention)

Figure 1:
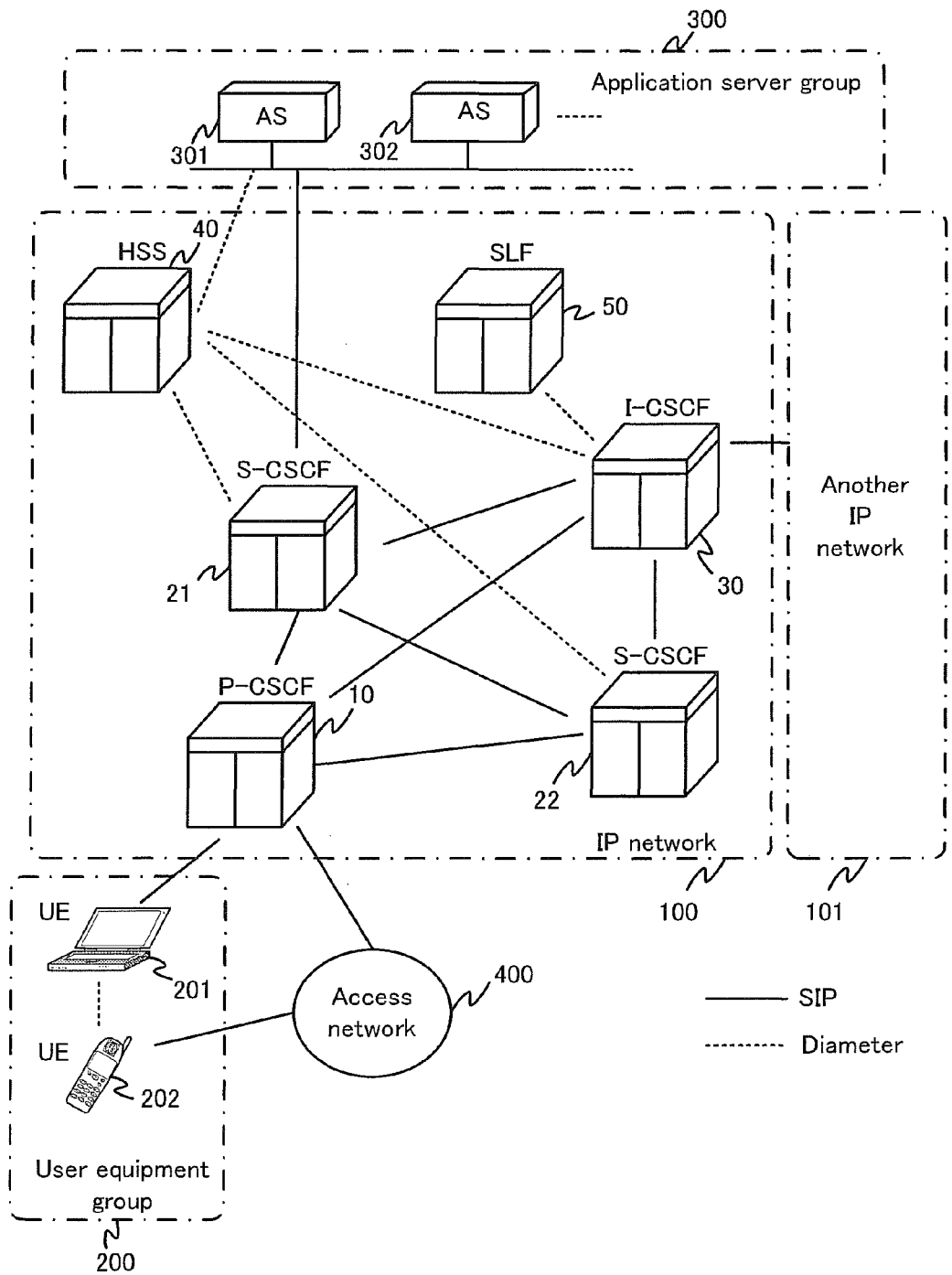
FIG. 1 is a system configuration diagram of an exemplified system configuration of the IP network in the IMS architecture to which the present invention is applied.
Figure 5:
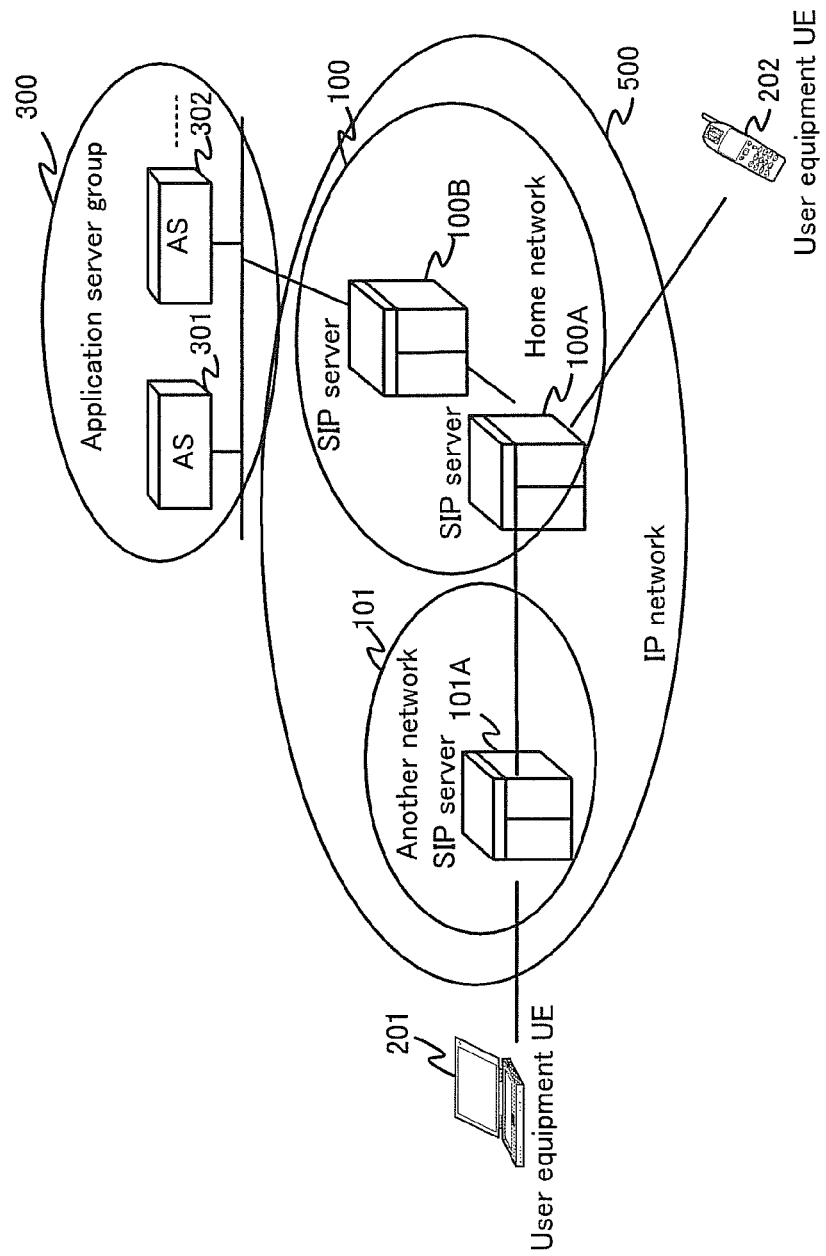
FIG. 5 is a conceptual diagram to show basic constituent elements that constitute the IMS network.
Figure 6:
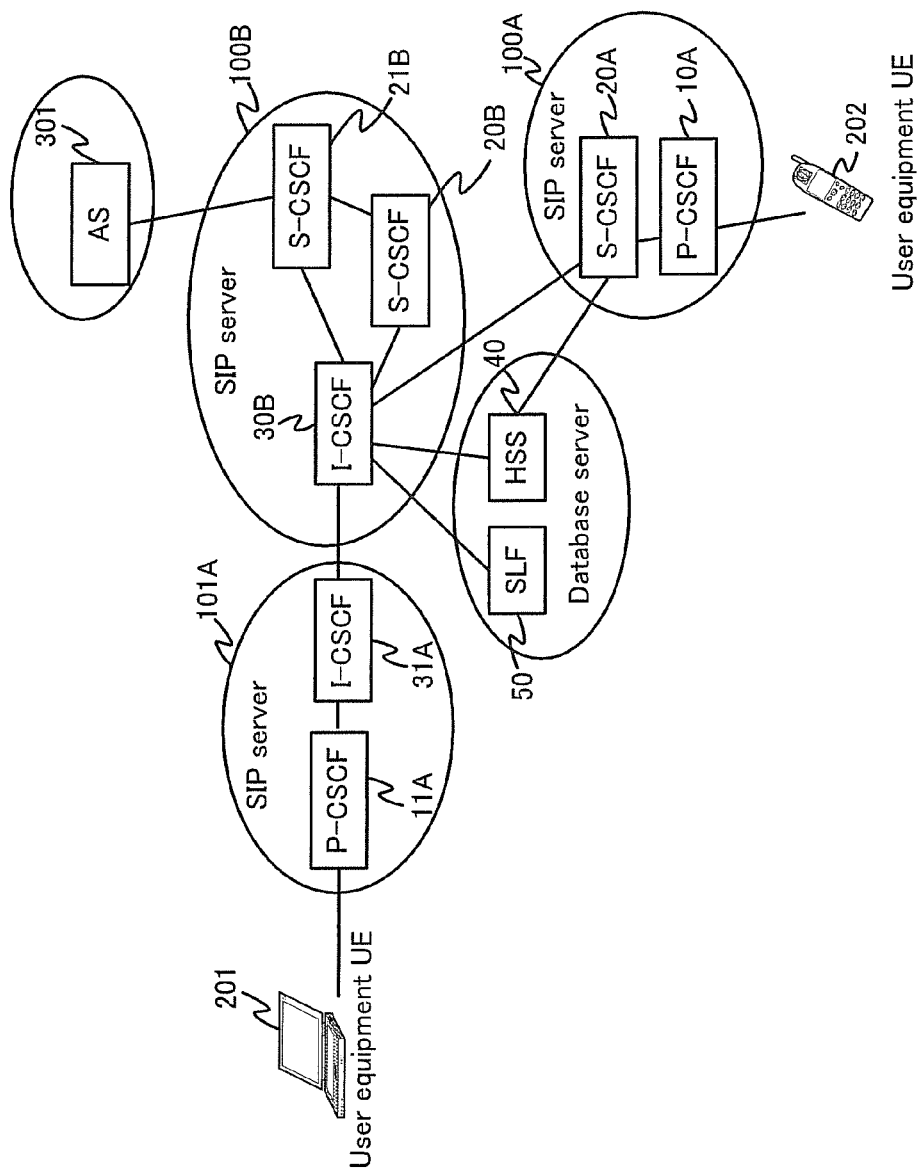
FIG. 6 is a conceptual diagram to show functions of the SIP server that constitutes a core of the IP network of the IMS architecture.
Figure 7:
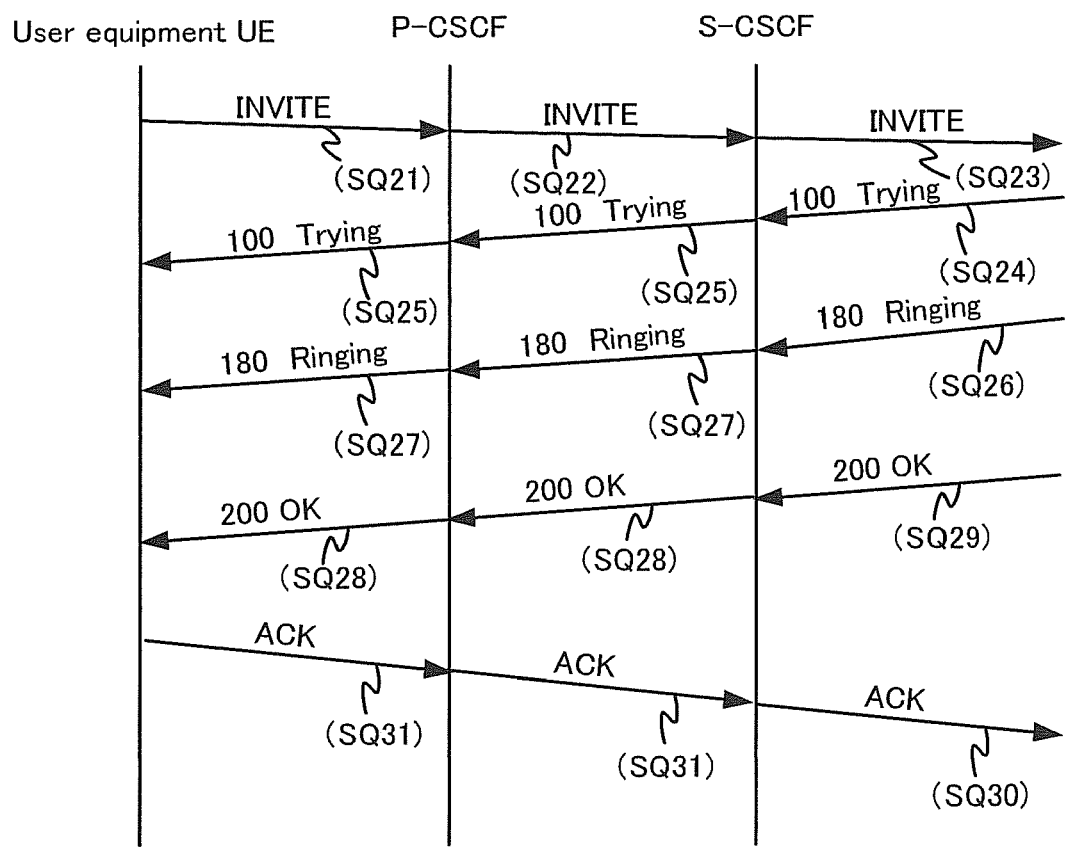
FIG. 7 is a sequence chart to show flows of transmission or calling procedures when a user equipment performs IMS communications.
Figure 8:
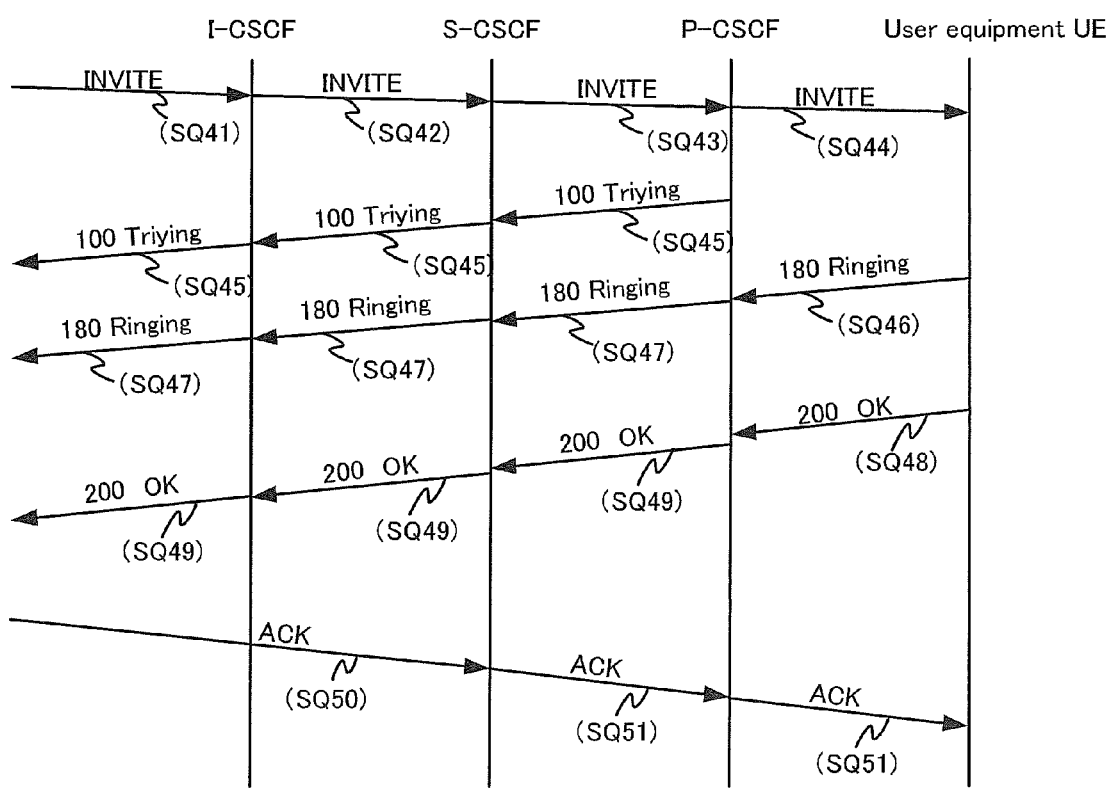
FIG. 8 is a flowchart to show flow of receiving procedures when a user equipment performs IMS communications.
Figure 9:
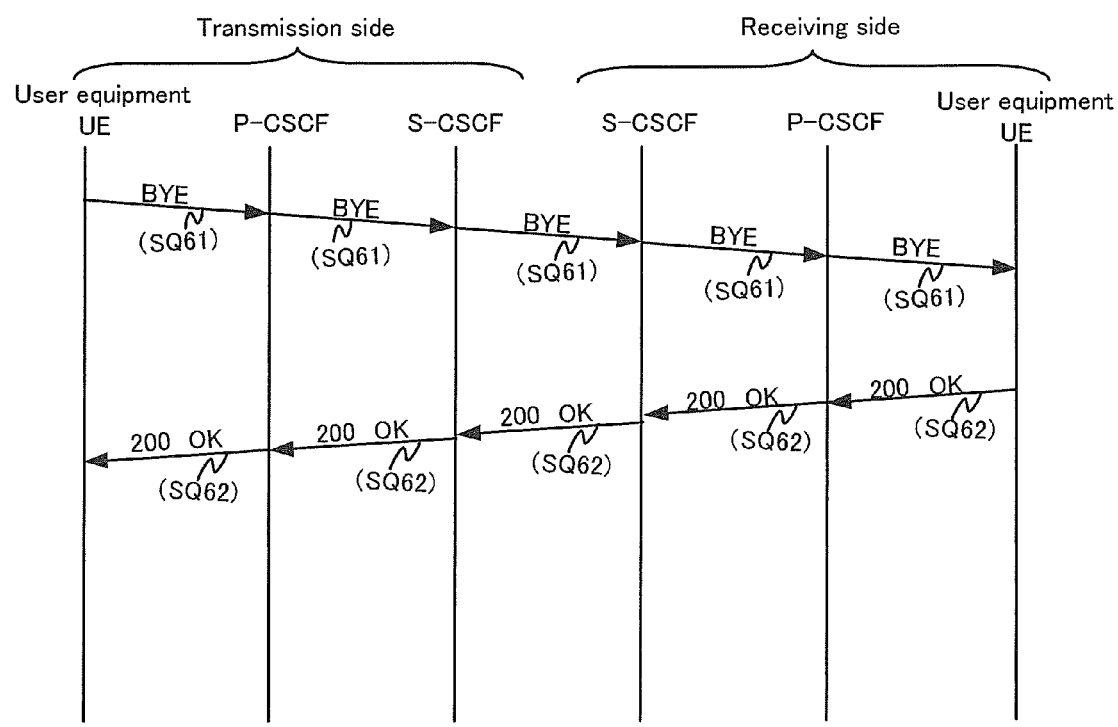
FIG. 9 is a sequence chart to show flows of procedures when an user equipment terminates an IMS communication.

Now, FIG. 1 is an exemplified system configuration of the IP network in the IMS architecture to which the present invention is applied. The system configuration as shown in FIG. 1 is generally similar to those in FIGS. 5 and 6 that have been described hereinabove in the background of the invention. It comprises at least an IP network 100 for forming a home network that includes a group of SIP servers having such functions as P-CSCF, I-CSCF and S-CSCF functions and a group of database servers including HSS servers (home subscriber servers) for registering user information (subscriber information) of each IMS user to perform IMS communications and SLF servers (subscriber locator function) for registering correspondence between a plurality of HSS servers and users.

In the particular example of system configuration as shown in FIG. 1, the group of SIP servers in the IP network 100 comprises a P-CSCF server (a user equipment accommodation session control server) 10 to be connected to user equipment UE (User equipment) 201, 202, . . . either directly or by way of an access network 400, S-CSCF servers (call session control servers) 21, 22 for administration of call session control of user equipment UE 201, 202, . . . and an I-CSCF server (interrogating session control server) 30 having a gateway function to other IP network 101.

On the other hand, the group of database server in the IP network 100 comprises HSS servers 40 that register user information (subscriber information) of each user for performing IMS communications using the IP network as a home network and an SLF server 50 that records information to identify a particular HSS server 40 in which user information for each user is stored.

Moreover, there are provided application servers AS 301, 302, . . . as an application server group 300. The application servers AS are connected to S-CSCF server 21 and the like by way of a standard interface known as the ISC (IMS Service Control) on the SIP base.

It is to be noted in the system configuration as shown in FIG. 1 that solid lines interconnecting the SIP servers (P-CSCF server 10, S-CSCF server 21, 22 and I-CSCF server 30), the HSS servers 40, application servers AS 301, 302, . . . and user equipment UE 201, 202, . . . represent interfaces that communicate using the IP protocol. On the other hand, dotted lines represent interfaces that communicate using the Diameter protocol. The user equipment UE 201, 202, . . . that use the IP network 100 as the home network are able to make a roaming connection with another IP network 101 by way of the I-CSCF server 30 even if they may move to the such IP network 101. This means that they can enjoy the same IMS communication services as they are in the IP network 100 of the home network.

Figure 2:
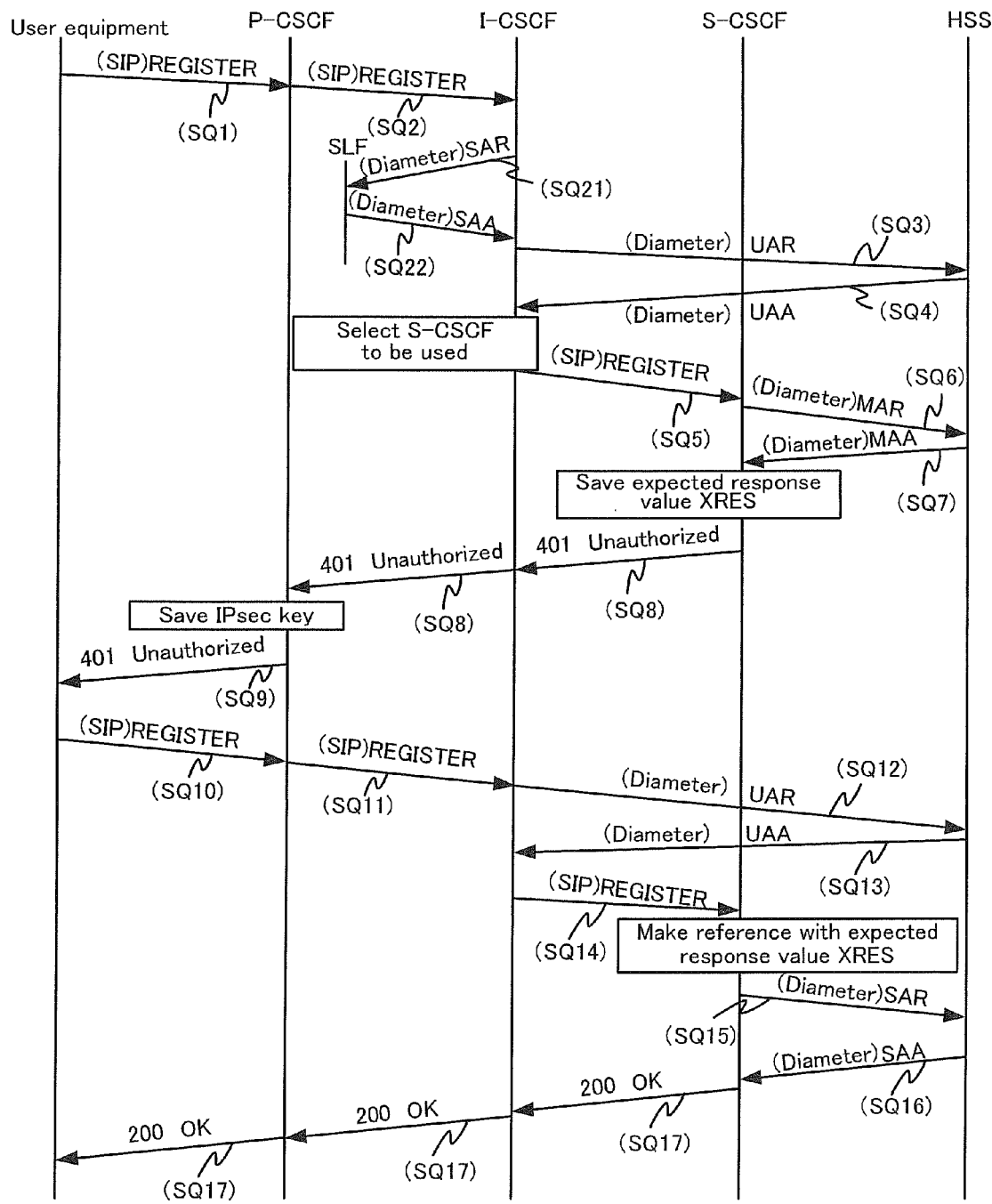
FIG. 2 is a flowchart to show the registration procedures of a user equipment to an S-CSCF server prior to starting IMS communications.

Now, basic procedures that IMS subscriber users register the S-CSCF server (call session control server) for performing IMS communications will be described with reference to FIG. 2. FIG. 2 is a sequence chart to show flows that the user equipment UE makes registration to the S-CSCF server prior to starting IMS communications. A description will be made hereunder on an example when the user equipment 201 in FIG. 1 makes registration to the S-CSCF server 21.

When performing IMS communications, it is absolutely required that the user equipment UE 201 undergoes registration procedures to the S-CSCF server 21 prior to transmission or calling operation. This is because mobile equipment are handled equally as parts of the user equipment UE in IMS communications, thereby requiring to register at least their current locations to the S-CSCF server 21 that administrates the call session control so that any user equipment UE can receive a call. Moreover, user authentication and IPsec (IP security protocol) are established at the registration time for maintaining communication security.

Registration for IMS communication is performed by mutually authenticating between the user equipment UE 201 side and the IP network side of the IMS network based upon the user information of the IMS subscriber user (private user ID (IMPI)), public user ID (IMPU) and long term common key (Ki). The user information to be used for authentication is stored for registration in both of UICC (Universal Integrated Circuit Card) to be installed in the user equipment UE 201 and the HSS server 40 within the IP network 100. It is to be noted herein that the public user ID (IMPU) is an identifier corresponding to the telephone number in accordance with the E.164 Recommendation that enables to uniquely identify the user equipment UE 201.

In FIG. 2, when the user equipment UE 201 first transmits to the P-CSCF server 10 a "SIP REGISTER message" including the private user ID (IMPI) and an URI (Uniform Resource Identifier) representing its home domain in order to request registration for IMS communications (sequence SQ1), the P-CSCF server 10 transfers the received "SIP REGISTER message" to the I-CSCF server 30 within the IP network 100 of the home IMS domain (sequence SQ2). The I-CSCF server 30 that received the "SIP REGISTER message" gains access to the HSS server 40 using the UAR (User Authorization Request) of the Diameter protocol (sequence SQ3) and receives candidates of S-CSCF servers that can be used in communication of the user equipment UE 201 in an UAA (User Authorization Answer) of the Diameter protocol (sequence SQ4). Then, the I-CSCF server 30 chooses the S-CSCF server 21 to be used in communication for the user equipment UE 201 among the candidates and transfers the "SIP REGISTER message" to the chosen S-CSCF server 21 (sequence SQ5).

It is to be noted here that, if there are a plurality of HSS servers in the IP network 100, HSS server selection procedures are carried out. In the procedures, the I-CSCF server 30 gains access to the SLF server 50 using an SAR (Server Assignment Request) of the Diameter protocol in order to identify the HSS server 40 to which the user information for that particular user equipment UE 201 is registered (sequence SQ21). Then, the information for identifying the HSS server 40 corresponding to the particular user equipment UE 201 is received from the SLF server 50 using a response signal of the Diameter protocol (sequence SQ22).

The S-CSCF server 21 that received the "SIP REGISTER message" informs the private user ID (IMPI), the public user ID (IMPU), its S-CSCF name and the like using an MAR (Multimedia Authentication Request) of the Diameter protocol and requests calculation of authentication vector (sequence SQ6). Based upon the private user ID (IMPI), the public user ID (IMPU) and its S-CSCF name, the HSS server 40 generates a random word RAND, generates the authentication vectors (an authentication token AUTN of the IP network 100, an expected response value XRES from the user equipment UE, a confidential key Ck to be used in the IPsec and a matching check key Ik to be used in the IPsec) using the generated random word RAND and the long term common key (Ki) which is then returned to the S-CSCF server 21 together with the random word RAND (sequence SQ7).

After saving only the expected response value XRES for making reference with an authentication response to be returned later from the user equipment UE 201 among the authentication vectors received from the HSS server 40, the S-CSCF server 21 returns the remaining authentication vectors and the random word RAND as a "401 Unauthorized message" to the P-CSCF server 10 by way of the I-CSCF server 30 (sequence SQ8). The P-CSCF server 10 that received the "401 Unauthorized message", after extracting and saving the confidential key Ck and the matching check key Ik as the common keys to be used for IPsec communications, returns to the user equipment UE 201 as the "401 Unauthorized message" including the authentication token AUTN and the random word RAND for the IP network 100 (sequence SQ9).

The user equipment UE 201 that received the "401 Unauthorized message" authenticates the authenticate token AUTN of the IP network 100 using the random word RAND and the long term common key (Ki) and also calculates a RES (Response), confidential key Ck and the matching check key Ik, sets to the IPsec communication conditions using the confidential key Ck and the matching check key Ik and returns to the P-CSCF server 10 the "SIP REGISTER message" including the authenticate response RES of the response value to the authenticate request (sequence SQ10). Upon receiving the confidential key Ck and the matching check key Ik, the SIP message between the user equipment UE 201 and the P-CSCF server 10 is protected by encryption as the IPsec communication.

The P-CSCF server 10 that received the "SIP REGISTER message" including the authenticate response RES transfers the "SIP REGISTER message" to the S-CSCF server 21 by way of the I-CSCF server 30 (sequence SQ10). It is to be noted at the time of receiving the "SIP REGISTER message" including the authenticate response RES that the I-CSCF server 30 interrogates the HSS server 40 in order to detect the S-CSCF server 30 that is chosen to register the user equipment UE 201 (sequence SQ12 and SQ13), thereby performing the transfer operation to the corresponding S-CSCF server 21 (sequence SQ14). If there are a plurality of HSS servers 40, a decision of a particular HSS server 40 is made by interrogating the SLF server 50 for the particular HSS server 40 in which the user information (subscriber information) for the user equipment UE 201 is saved and registered as is the case in the aforementioned sequence SQ2.

The S-CSCF server 21 that received the "SIP REGISTER message" including the authenticate response RES makes a reference of the authenticate response RES for the user equipment UE 201 and the saved response expectation value XRES. If the authentication is successful in determining that the user equipment UE 201 is valid, it is notified to the HSS server 40 that the communication registration for the user equipment UE 201 is made using an SAR (Server Assignment Request) of the Diameter protocol (sequence SQ15) and downloads the user profiles (public user ID IMPU), IFC (Initial Filter Criteria), location information and the like on the user) of the user equipment UE 201 from the FSS server 40 using the SAA of the Diameter protocol (sequence SQ16).

The S-CSCF server 21 that received the user profiles of the user equipment UE 201 from the HSS server 40 sends a "200 OK" indicating the completion of registration of the SIP communication for the user equipment UE 201 to the user equipment UE 201 by way of the I-CSCF server 30 and the P-CSCF server 10 (sequence SQ17). The foregoing procedures complete registration of the current location information and the user information (subscriber information) of the user equipment UE 201 into the S-CSCF server 21 and the user equipment UE 201 is set to the condition to enable transmission and receiving operation through the procedures of determining the S-CSCF server 21 that administrate the call session control of the user equipment UE 201 and the authentication procedures between the user equipment UE 201 and the IP network 100.

Figure 3:
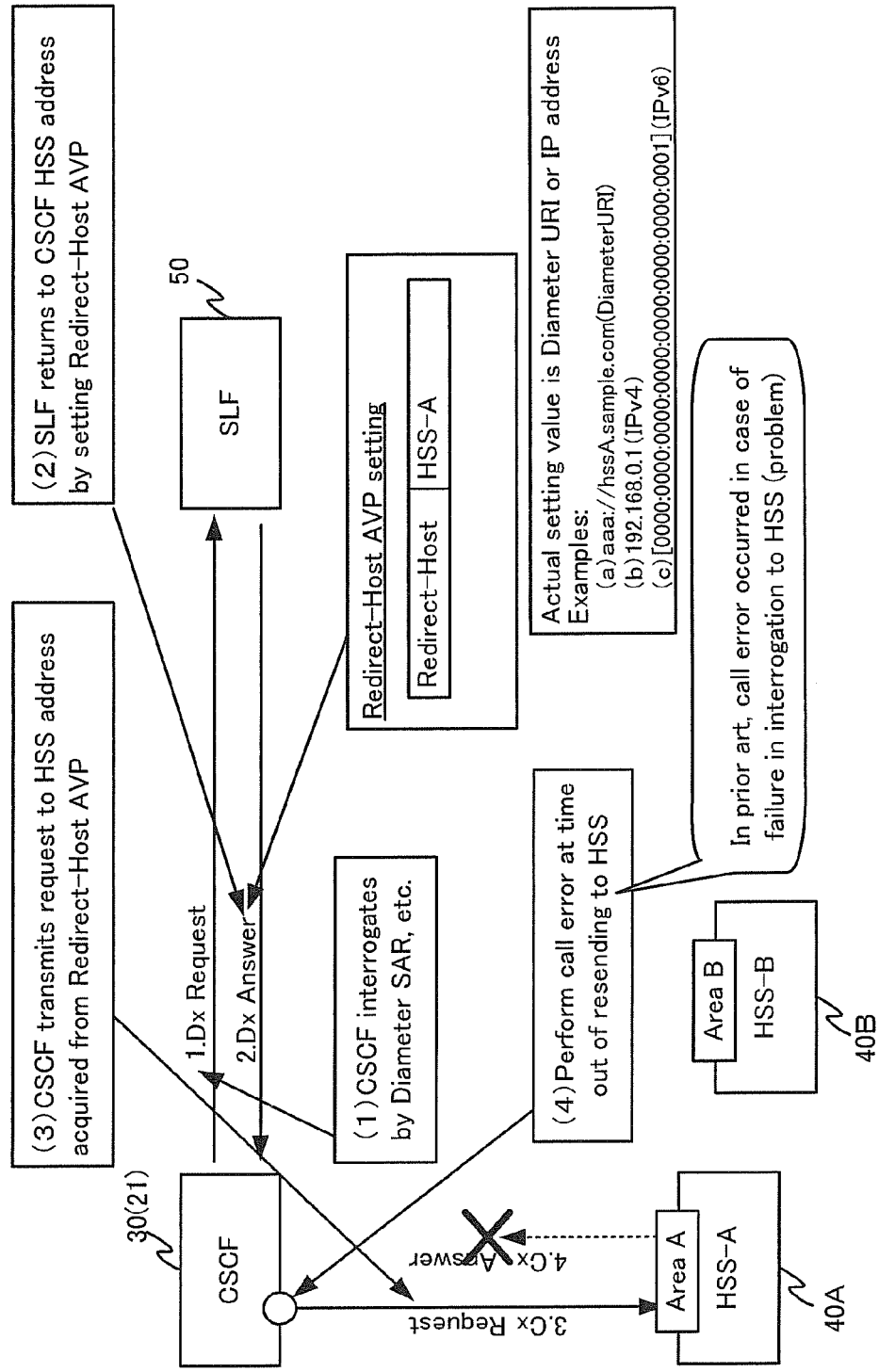
FIG. 3 is a diagram to show detailed access procedures to a conventional HSS server.

Among the registration procedures of the user equipment UE 201 into the S-CSCF server 21 as described hereinabove with reference to FIG. 2, the I-CSCF server 30 determines the particular HSS server 40 in which the user information for the user equipment UE 201 is registered based upon the information from the SLF server 50 by way of the sequence SQ21 and SQ22. In gaining access to the determined particular HSS server 40 by way of the sequence SQ3 and SQ4, employed are procedures as shown in FIG. 3. FIG. 3 is detailed descriptions to show conventional procedures for gaining access to the HSS server. It is to be noted that procedures as shown in FIG. 3 are followed when the S-CSCF server 21 gains access to the HSS server 40 in order to request calculation of the authenticate vectors in the sequence SQ6 and SQ7 in FIG. 2 and when gaining access to the HSS server 40 in order to cause the user information for the user equipment UE 201 to be transferred through the sequence SQ15 and SQ16, thereby determining the particular HSS server 40 by acquiring information from the SLF server 50 through the sequence similar to the sequence SQ21 and SQ22.

If there are a plurality of HSS servers as shown in FIG. 3, the CSCF servers (i.e., I-CSCF server 30 and S-CSCF server 21) first send an interrogation "Dx Request/" to the SLF server 50 by way of an interface Dx using the SAR or the like of the Diameter protocol (a first step). It is assumed here that there are HSS servers for respective areas in a redundant configuration, i.e., an HSS-A server 40A for an area A and an HSS-B server 40B for an area B.

The SLF server 50 that received the "Dx Request" recognizes that there are the HSS-A server 40A and the HSS-B server 40B to meet the needs for requests from the respective areas A and B. Either one of the HSS servers 40A and 40B is selected in accordance with the order of priority set in advance according to the requestors' conditions. For example, the HSS-A server 40A is selected and the access information for the HSS-A server 40A is set to parameters "redirect-Host AVP (Attribute Value Pair)/" such as an SAA or the like of the Diameter protocol and returns a "Dx Answer" to the CSCF servers (I-CSCF server 30 and the S-CSCF server 21) from which a request is originated by way of the interface Dx (a second step).

Examples of the access information to the HSS server, for example, the HSS-A server 40A that are actually set to the parameters "Redirect-Host AVP" are as follows:
(a) URI on the Diameter protocol "aaa://hssA.sample.com"
(b) IP address of Ipv4 standard "192.168.0.1"
(c) IP address of Ipv6 standard "0000:0000:0000:0000:0000:0000:0000:0001" etc.

The CSCF servers (i.e., the I-CSCF server 30 and the S-CSCF server 21) that received the access information of, for example, the HSS-A server 40A that is set to the parameters "Redirect-Host AVP" from the SLF server 50 as a result of HSS selection, transmit a "Cx Request" that requests the HSS-A server 40A for information for selecting, for example, the S-CSCF by way of the interface Cx using the UAR or the like of the Diameter protocol (a third step).

Now, when that the HSS-A server 40A that received the "Cx Request" from the CSCF servers (the I-CSCF server 30 and the S-CSCF server 21) failed to return response information "Cx Answer" to the sender due to power shut-off, network trouble or any other cause (a fourth step), resend operations are repeated as a result of expirations of time that the CSCF servers (the I-CSCF server 30 and the S-CSCF server 21) wait for a response. If no response information from the HSS-A server 40A is received in the resend operations, the CSCF servers (the I-CSCF server 30 and the S-CSCF server 21) are obliged to interrupt the registration, abandon to establish a session or handle as call errors because information that is necessary for registering the user equipment UE and/or establishing a call session was not acquired.

When the HSS-B server 40B for the area B exists as a redundant configuration, if the CSCF servers (the I-CSCF server 30 and the S-CSCF server 21) do not know how to gain access to the HSS-B server 40B and if an attempt is made for the SLF server 50 to return access information for the redundant HSS-B server 40B, the prior art is not provided with means for promptly performing such operation. As a result, it is impossible to acquire information for the HSS-B server 40B that replaces the HSS-A server 40A from the SLF server 50.

Figure 4:
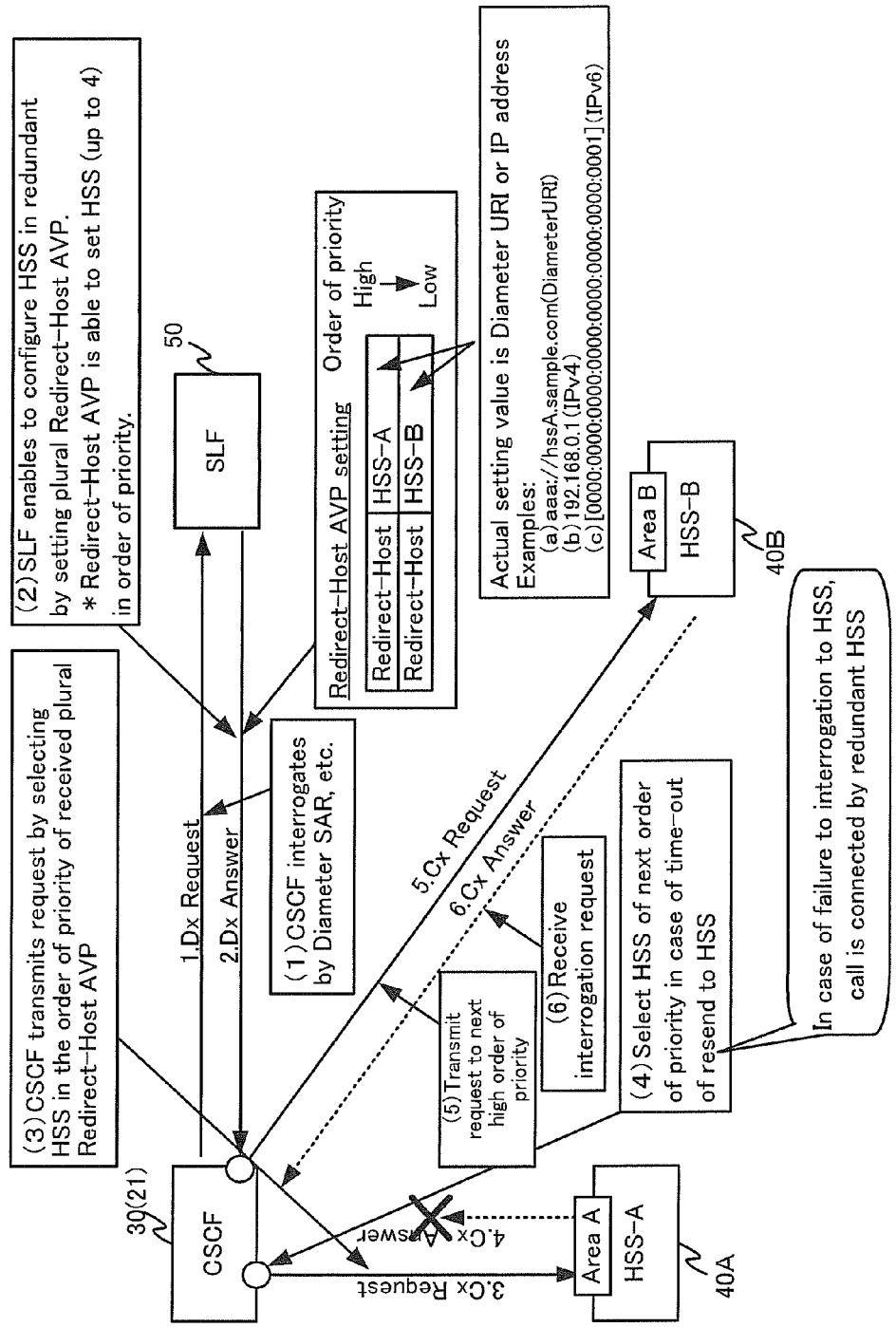
FIG. 4 is an exemplified diagram to show detailed access procedures to HSS servers in the present invention.

Unlike the case in FIG. 3, the preferred embodiment according to the present invention as shown in FIG. 4 is provides with HSS servers distributed to respective areas in a redundant configuration. The HSS-A server 40A for the area A and the HSS-B server 40B for the area B perform data synchronizing procedures for making the information stored in the both HSS servers identical to each other either periodically or whenever renewal of the stored information takes place, thereby maintaining the both of the HSS-A server 40A and the HSS-B server B in a condition to be selectively used. FIG. 4 is an exemplary diagram to show detailed procedures for gaining access to the HSS servers in the present invention.

Moreover, as shown in FIG. 4, when the SLF server 50 recognizes the HSS-A server 40A and the HSS-B server 40B for the area A and the area B in order to satisfy the requestors' needs for each area, these accessible HSS servers (i.e., the HSS-A server 40A and the HSS-B server 40B in the particular example in FIG. 4) are listed in accordance with the predetermined order of priority in response to the requestors' conditions so that such list can be returned to the requested CSCF servers (the I-CSCF server 30 and the S-CSCF server 21).

Now, the sequence as shown in FIG. 4 will be described hereunder when the plurality of HSS servers have synchronized information. Similar to the case in FIG. 3, the CSCF servers (the I-CSCF server 30 and the S-CSCF server 21) first send the "Dx Request" to inquire the SLF server 50 by way of the interface Dx using SAP or the like of the Diameter protocol (a first step).

Unlike the case in FIG. 3, the SLF server 50 that received the "Dx Request" recognizes the existence of the HSS-A server 40A and the HSS-B server 40B for the area A and the area B to satisfy the requestors' needs, rearranges the HSS servers (i.e., the HSS-A server 40A and the HSS-B server 40B in the particular example in FIG. 4) in accordance with the predetermined higher order of priority in response to the requestors' conditions, sequentially sets the access information of the respective HSS servers in the parameters "Redirect-Host AVP" such as SAA or the like of the Diameter protocol and sends the "Dx Answer" to the CSCF servers (the I-CSCF server 30 and the S-CSCF server 21) from which the request is originated (a second step). In other words, in this embodiment, the SLF server 50 sets the access information for the HSS servers in the order of priority in a plurality of parameters "Redirect-Host AVP/" equal to the total number of the HSS servers that are recognized to satisfy the requestors' needs.

It is to be noted that the number of parameters "Redirect-Host AVP" to be set should not restricted to two as shown in FIG. 4, but can be extended to up to four (or may be further extended). The access information actually set to the parameters "Redirect-Host AVP" in the HSS server, for example, the HSS-A server 40A may be similar to the case in FIG. 3 as follows:
(a) URI on the Diameter protocol "aaa://hssA.sample.com"
(b) IP address of IPv4 standard "192.168.0.1"
(c) IP address of IPv6 standard "0000:0000:0000:0000:0000:0000:0000:0001" etc.

The CSCF servers (the I-CSCF server 30 and the S-CSCF server 21) that received plurality of parameters "Redirect-Host AVP" such as SAA and the like from the SLF server 50 as a result of HSS selection send the "Cx Request" by way of the interface Cx using, for example, UAR and the like of the Diameter protocol requesting the S-CSCF selection information to one of the HSS servers, for example, the HSS-A 40A having the highest order of priority that is determined by the SLF server 50 from the access information for the HSS server set to the plurality of parameters "Redirect-Host AVP" or newly determined by the CSCF servers (the I-CSCF server 30 and the S-CSCF server 21) (a third step).

In case where the HSS-A server 40A that received the "Cx Request" from the CSCF servers (the I-CSCF server 30 and the S-CSCF server 21) fails to return to the requestor any information in response to the "Cx Request" due to power shut-off, network trouble or any other cause (a fourth step), resend operations will be repeated for any desired times (the number may be set to 0 if desired so) as a result of expiration of time to wait for the response at the CSCF servers (the I-CSCF server 30 and the S-CSCF server 21) side.

If no response information is received from the HSS-A server 40A in the resending operations, the CSCF servers (the I-CSCF server 30 and the S-CSCF server 21) select, for example, the HSS-B server 40B having the subsequent order of priority from the information for the HSS servers that are set to the plurality of parameters "Redirect-Host AVP". Then, another "Cx Request" is sent to the HSS-B server 40B for the area B by way of the interface Cx using UAR and the like of the Diameter protocol that requests information for selecting the S-CSCF server (a fifth step).

It is to be noted here that the information stored in the HSS-B server 40B for the area B is synchronized data with those of the HSS-A server 40A for the area A. The identical information can be returned from the HSS-B server 40B on receiving an inquiry from the CSCF servers (the I-CSCF server 30 and the S-CSCF server 21). Consequently, the CSCF servers (the I-CSCF server 30 and the S-CSCF server 21) receive the "Cx Answer" from the HSS-B server 40B by way of the interface Cx using UAA and the like of the Diameter protocol for, for example, information for S-CSCF selection (a sixth step).

As a result, the CSCF servers (the I-CSCF server 30 and the S-CSCF server 21) are able to acquire information that are necessary for registration of the user equipment UE or establishing call session, thereby enabling to continue the registration procedures for user equipment UE, establish call sessions and continue to connect calls.

Although the HSS servers in a redundant configuration in the example as shown in FIG. 4 are only two, i.e., the HSS-A server 40A for the area A and the HSS-B server 40B for the area B, the present invention should not be limited to such particular case and the number of HSS servers may be more than two (extended to up to four). Moreover, for the purpose of data synchronization of the information that are stored in the HSS servers in a redundant configuration, operations for making reference among the HSS servers are performed periodically at a predetermined time interval, thereby equalizing the information in such HSS servers. The original information to be synchronized may be determined by the majority decision, based upon the predetermined order of priority, or based upon a result of checking rationality of information in the HSS servers.

Additionally, the timing of synchronizing the information in plural HSS servers may be whenever renewal of information takes place rather than periodically at a predetermined time interval as described hereinabove, thereby maintaining the same information in the plural HSS servers at any time. Even in this case, it is possible to periodically make reference operations of information in the plural HSS servers for confirmation of information synchronism.

An exemplary embodiment of the present invention has been described hereinabove. However, it is to be noted that such embodiment is nothing but an example of the present invention and that the present invention should not be restricted to such embodiment. It is easily understood for a person having an ordinary skill in the art that various modifications and alternations can be made to best fit for particular applications without departing from the scope and spirit of the present invention.

What is claimed is:

1. A home subscriber server configuration method in an IP network for achieving an IMS (IP Multimedia Subsystem) architecture, wherein a plurality of home subscriber servers (HSS servers) are provided for storing user information of user equipment and information for selecting call session control server (S-CSCF server) that administrates call session control, the plurality of HSS servers are in a redundant configuration for respective areas, and a particular HSS server to be accessed by an inquiry session control server (I-CSCF server) to determine the S-CSCF server to register a new user equipment or the S-CSCF server is determined by sending an interrogation from the I-CSCF server or the S-CSCF server to a subscriber locator server (SLF server) that stores a correspondence between the plurality of HSS servers and user equipment, comprising the steps of:

synchronizing the information to be stored in the plurality of HSS servers in the redundant configuration; and sending by the SLF server that receives the interrogation from the I-CSCF server or the S-CSCF server access information corresponding to the interrogation for the plurality of HSS servers back to the I-CSCF server or the S-CSCF server from which the interrogation is originated, wherein in case of sending the access information corresponding to the interrogation back to the plurality of HSS servers, the SLF server rearranges in accordance with the predetermined order of priority before sending back.

2. A home subscriber server configuration method of claim 1, wherein in case of using the Diameter protocol for information exchange between the SLF server and the I-CSCF server or the S-CSCF server, the SLF server sends back by setting the access information to the plurality of HSS servers in parameters Redirect-Host AVP (Attribute Value pair) that are included in a response signal of the Diameter protocol.

3. A home subscriber server configuration method of claim 1, wherein the synchronizing operation of the information stored in the plural HSS servers in a redundant configuration is performed whenever the information stored in either one of the HSS servers takes place, thereby renewing information stored in other HSS servers to the same information.

4. A home subscriber server configuration method of claim 1, wherein the synchronizing operation of the information stored in the plural HSS servers is performed periodically at a predetermined time interval.

5. A home subscriber server configuration method of claim 4, wherein at the time of synchronizing information stored in each of the HSS servers, the original information for synchronizing each of the HSS servers is determined by majority decision, the information in a predetermined single HSS server, or based upon a result of the information rationality check.

6. A home subscriber server configuration method in an IP network for achieving an IMS (IP Multimedia Subsystem) architecture, wherein a plurality of home subscriber servers (HSS servers) are provided for storing user information of user equipment and information for selecting call session control server (S-CSCF server) that administrates call session control, the plurality of HSS servers are in a redundant configuration for respective areas, and a particular HSS server to be accessed by an inquiry session control server (I-CSCF server) to determine the S-CSCF server to register a new user equipment or the S-CSCF server is determined by sending an interrogation from the I-CSCF server or the S-CSCF server to a subscriber locator server (SLF server) that stores a correspondence between the plurality of HSS servers and user equipment, comprising the steps of:

synchronizing the information to be stored in the plurality of HSS servers in the redundant configuration; and sending by the SLF server that receives the interrogation from the I-CSCF server or the S-CSCF server access information corresponding to the interrogation for the plurality of HSS servers back to the I-CSCF server or the S-CSCF server from which the interrogation is originated, wherein the I-CSCF server or the S-CSCF server that received the access information to the plurality of HSS servers corresponding to the interrogation from the SLF server gains access to the selected one of the plurality of HSS servers in accordance with the order that is transmitted from the SLF server or the order of priority that is predetermined by the I-CSCF server or the S-CSCF server.

7. A home subscriber server configuration method of claim 6, wherein the I-CSCF server or the S-CSCF server selects the subsequent HSS server from the plural HSS servers if no response is received from the one HSS server within a predetermined time after the access to the one HSS server or if no response is received from the HSS server in response to accesses of a predetermined number of resending operations, thereby gaining access to the selected HSS server by switching thereto.

8. A home subscriber server configuration system in an IP network for realizing an IMS (IP Multimedia Subsystem) architecture having a plurality of home subscriber servers (HSS servers) in a redundant configuration for respective areas for storing user information for user equipment and information to select a call control server (S-CSCF server) for administering call session control by sending an interrogation to a subscriber locator server (SLF server) that stores the correspondence between the plurality of HSS servers and the user equipment from an interrogating session control server (I-CSCF server) for determining the S-CSCF server to register a new user equipment or from the S-CSCF server to determine the particular HSS server to be accessed by the I-CSCF server or the S-CSCF server, characterized in that:
information stored in the plural HSS servers in a redundant configuration are synchronized; and
when an interrogation is received from the I-CSCF server or the S-CSCF server, the SLF server sends access information to the plurality of HSS servers corresponding to the interrogation back to the I-CSCF server or the S-CSCF server from which the interrogation is originated,
wherein the SLF server rearranges the plural HSS servers in accordance with the predetermined order of priority when sending back the access information for the plural HSS servers corresponding to the interrogation.

9. A home subscriber server configuration system in an IP network for realizing an IMS (IP Multimedia Subsystem) architecture having a plurality of home subscriber servers (HSS servers) in a redundant configuration for respective areas for storing user information for user equipment and information to select a call control server (S-CSCF server) for administering call session control by sending an interrogation to a subscriber locator server (SLF server) that stores the correspondence between the plurality of HSS servers and the user equipment from an interrogating session control server (I-CSCF server) for determining the S-CSCF server to register a new user equipment or from the S-CSCF server to determine the particular HSS server to be accessed by the I-CSCF server or the S-CSCF server, characterized in that:
information stored in the plural HSS servers in a redundant configuration are synchronized; and
when an interrogation is received from the I-CSCF server or the S-CSCF server, the SLF server sends access information to the plurality of HSS servers corresponding to the interrogation back to the I-CSCF server or the S-CSCF server from which the interrogation is originated,
wherein the I-CSCF server or the S-CSCF server that received the access information to the plural HSS servers corresponding to the interrogation from the SLF server gains access to the HSS servers selected from the plurality of HSS servers in accordance with the sequence sent from the SLF server or the order of priority predetermined in the I-CSCF server or the S-CSCF server.

10. A home subscriber server configuration system of claim 9, wherein the I-CSCF server or the S-CSCF server selects the next one of the HSS servers and gains access to the selected HSS server after switching thereto if no response is received from the HSS server in response to the access for a predetermined time from the access to the HSS server or if no response is received from the HSS server in response to the access of predetermined times of resending operations.

* * * * *